UNITED STATES PATENT OFFICE.

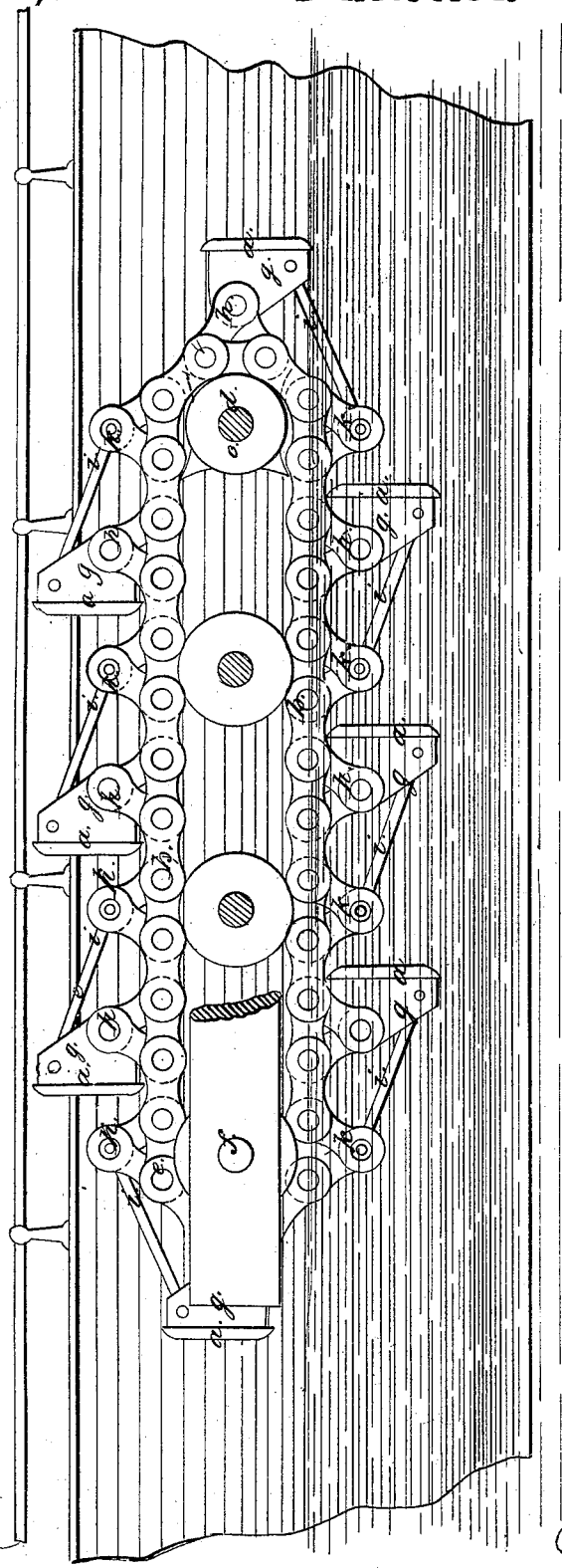

THOMAS MASON, OF BOSTON, MASSACHUSETTS.

IMPROVED MARINE PROPELLER.

Specification forming part of Letters Patent No. 44,641, dated October 11, 1864.

*To all whom it may concern:*

Be it known that I, THOMAS MASON, of Boston, county of Suffolk, and State of Massachusetts, have invented an Improved Propeller for Vessels; and I do hereby declare that the following, taken in connection with the drawing which accompanies and forms part of this specification, is a description of my invention sufficient to enable those skilled in the art to practice it.

My invention relates to the construction of propellers for steamboats, having particular reference to the arrangement of a series of feathering paddles upon endless chains, which extend and traverse around two sets of pulleys or wheels, placed at suitable distance apart to allow the floats to have a horizontal movement, the invention consisting in the arrangement and mode of operation of the paddles.

The drawing represents a side elevation of the paddles, the counterpart to the chains and wheels represented being placed at the inner ends of the paddles.

$a\ a$ denote the paddle-blades; $b$, an endless plate-chain, upon which the blades $a$ are hung at each end. Each chain works upon a sprocket-wheel, $c$, at one end, the two sprocket-wheels being placed upon a driving-shaft, $d$, and at the other end passing around grooved guide-wheels $e$ on a shaft, $f$. Each end of each paddle-blade has a plate, $g$, projecting from it, the paddle being hung by these plates upon brackets $h$ on the outer sides of the links of the chain, and so as to turn freely on the brackets, the joint-pin passing through one side of the plate, as seen in the drawing. A connecting rod or link, $i$, extends from the other end of each plate $g$ to the top of another bracket, $k$. As the paddle-blades move horizontally between the wheels, or from one wheel to the other, they remain stationary with respect to the chains, being in proper position, when moving horizontally in the water, to propel the vessel.

As each paddle reaches the wheel $c$ or $e$, instead of standing in a radial direction and striking or leaving the water flatwise, the paddle is turned so as to present its edge to the water, as follows: As the bracket $k$, to which the rod $i$ is connected, reaches and begins to rotate on the wheel $c$ or $e$, its end is drawn away from the bracket $h$, the distance between them increasing until the first bracket is in the same horizontal plane with the wheel-shaft, and the next bracket comes against the wheel. This separation, of course, draws upon the rod $i$, which tips the blade $a$, so that when passing into and through the water or out of it, around the wheel, it cuts the water, while before it passes beyond the immediate action of the wheels the brackets are again restored to their nearest position to each other, and the blade thereby carried back against the chain.

By the arrangement of the paddle-blades to move horizontally through the water and around the wheels, as described, instead of mounting them in, or so as to form part of a circular or cylindrical feathering paddle-wheel in the usual manner, a larger extent of acting or propelling surface may be brought into operation against the water, and the paddle-boxes are dispensed with.

The arrangement can be applied to canal-boats and other vessels where the diameter of a common paddle-wheel of suitable size renders its employment impracticable.

Supporting rollers or drums may be placed between the wheels $c$ and $e$ to prevent sagging of the chains.

I claim—

The combination of the feathering paddle-blades $a$ and sprocket-chains $b$, when the links of the chains and the blades attached thereto are so arranged as to have a horizontal movement between the sprocket-wheels $c\ e$, substantially as and for the purpose set forth.

THOMAS MASON.

Witnesses:
J. B. CROSBY,
F. GOULD.